(12) United States Patent
Palmer et al.

(10) Patent No.: US 10,683,754 B2
(45) Date of Patent: Jun. 16, 2020

(54) APPARATUS AND METHODS FOR CONTROLLING RECIPROCATING INTERNAL COMBUSTION ENGINES

(71) Applicant: ROLLS-ROYCE plc, London (GB)

(72) Inventors: Chloe J. Palmer, Derby (GB); Jia Qing Alastair Milton Sim, Derby (GB); Ahmed My Razak, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/139,265

(22) Filed: Sep. 24, 2018

(65) Prior Publication Data

US 2019/0120053 A1    Apr. 25, 2019

(30) Foreign Application Priority Data

Oct. 24, 2017 (GB) .................................. 1717438.4

(51) Int. Cl.
| | | |
|---|---|---|
| *F01B 17/02* | (2006.01) | |
| *F02M 23/00* | (2006.01) | |
| *F02M 25/00* | (2006.01) | |
| *F02M 31/00* | (2006.01) | |
| *F01K 25/06* | (2006.01) | |

(Continued)

(52) U.S. Cl.
CPC ............ *F01B 17/025* (2013.01); *F01K 25/06* (2013.01); *F01L 1/38* (2013.01); *F02B 1/10* (2013.01); *F02B 1/14* (2013.01); *F02B 75/02* (2013.01); *F02M 23/00* (2013.01); *F02M 25/00* (2013.01); *F02M 31/00* (2013.01); *F02B 2075/028* (2013.01); *F02M 2023/008* (2013.01); *F02M 2700/43* (2013.01)

(58) Field of Classification Search
CPC ... F02B 75/02; F02B 17/005; F02B 2043/103
See application file for complete search history.

(56) References Cited

U.S. PATENT DOCUMENTS 3,315,650 A * 4/1967 Bishop ................. F02B 23/105
                                                    123/255
5,444,981 A   8/1995 Kakovitch
(Continued)

FOREIGN PATENT DOCUMENTS

| CN | 206205989 | 5/2017 |
| DE | 19606559 | 8/1997 |

(Continued)

OTHER PUBLICATIONS

U.S. Appl. No. 16/139,246, filed Sep. 24, 2018 in the name of Palmer, C.J., et al.

(Continued)

*Primary Examiner* — Long T Tran
(74) *Attorney, Agent, or Firm* — Oliff PLC

(57) ABSTRACT

A method of controlling a reciprocating internal combustion engine comprising: a cylinder defining a cavity having a first end and a second end; and a piston moveable within the cavity of the cylinder between the first end and the second end, the method comprising: receiving at least a first signal; determining a quantity of liquid air to be injected using at least the received first signal; controlling injection of the determined quantity of liquid air into the first end of the cavity at a first time when the piston is closer to the first end than the second end.

20 Claims, 10 Drawing Sheets

(51) Int. Cl.
   *F01L 1/38* (2006.01)
   *F02B 1/10* (2006.01)
   *F02B 1/14* (2006.01)
   *F02B 75/02* (2006.01)

(56) References Cited

U.S. PATENT DOCUMENTS

| | | |
|---|---|---|
| 6,311,651 B1 | 11/2001 | Singh |
| 2009/0056670 A1 | 3/2009 | Zhao et al. |
| 2009/0241895 A1* | 10/2009 | Hedman ................. F02B 47/02 123/25 C |
| 2013/0340717 A1 | 12/2013 | Avery et al. |
| 2016/0025027 A1* | 1/2016 | Mentele ................. F02D 41/22 701/102 |
| 2016/0215723 A1 | 7/2016 | Thomas et al. |
| 2016/0245235 A1 | 8/2016 | Jung |
| 2016/0363081 A1* | 12/2016 | Osaka ................. F02M 61/182 |
| 2017/0058768 A1 | 3/2017 | Bergins et al. |

FOREIGN PATENT DOCUMENTS

| | | |
|---|---|---|
| EP | 3020944 | 5/2016 |
| GB | 189316900 | 7/1894 |
| GB | 190013488 | 7/1901 |
| GB | 2457744 | 8/2009 |
| JP | S59115428 | 7/1984 |
| JP | 1138360 | 5/1987 |
| WO | 2016162692 | 10/2016 |

OTHER PUBLICATIONS

Great Britain Search Report dated Apr. 17, 2018, issued in GB Patent Application No. 1717437.6.
Great Britain Search Report dated Mar. 6, 2018, issued in GB Patent Application No. 1717438.4.
Mar. 18, 2019 Search Report issued in European Patent Application No. 18196287.9.
Mar. 26, 2020 Patent Office Communication issued in European Patent Application No. 18196287.9.

* cited by examiner

US 10,683,754 B2

APPARATUS AND METHODS FOR CONTROLLING RECIPROCATING INTERNAL COMBUSTION ENGINES

CROSS-REFERENCE TO RELATED APPLICATIONS

This specification is based upon and claims the benefit of priority from UK Patent Application Number 1717438.4 filed on 24 Oct. 2017, the entire contents of which are incorporated herein by reference.

BACKGROUND

Technological Field

The present disclosure concerns apparatus and methods for controlling reciprocating internal combustion engines.

Description of the Related Art

Reciprocating internal combustion engines usually include one or more cylinders which define a cavity, and a piston moveable within the cavity of the cylinder. A hydrocarbon fuel (such as diesel or petroleum) may be injected into the cylinder and ignited. The pressure generated by the combustion of the hydrocarbon fuel causes the piston to move reciprocally within the cylinder and rotate a crankshaft.

SUMMARY

According to a first aspect there is provided a method of controlling a reciprocating internal combustion engine comprising: a cylinder defining a cavity having a first end and a second end; and a piston moveable within the cavity of the cylinder between the first end and the second end, the method comprising: receiving at least a first signal; determining a quantity of liquid air to be injected using at least the received first signal; controlling injection of the determined quantity of liquid air into the first end of the cavity at a first time when the piston is closer to the first end than the second end.

The first signal may include user input data defining the fuel.

The first signal may include data defining one or more properties of the fuel. The one or more properties may include a combustion property of the fuel.

The first signal may include data defining an operating parameter of the reciprocating internal combustion engine.

The method may further comprise controlling injection of fuel into the first end of the cavity to cause the piston to perform a power stroke.

The determined quantity of liquid air may be injected into the first end of the cavity without fuel to cause the piston to perform a first power stroke.

The method may further comprise controlling injection of fuel into the first end of the cavity at a second time when the piston is closer to the first end than the second end to cause the piston to perform a second power stroke.

The method may further comprise controlling injection of fuel into the first end of the cavity at a third time when the piston is closer to the first end than the second end to cause the piston to perform an initial power stroke, the third time being prior to the first time.

The liquid air may have greater oxygen content than atmospheric air.

According to a second aspect there is provided a computer program that, when read by a computer, causes performance of the method as described in the preceding paragraphs.

According to a third aspect there is provided a non-transitory computer readable storage medium comprising computer readable instructions that, when read by a computer, cause performance of the method as described in the preceding paragraphs.

According to a fourth aspect there is provided apparatus for controlling a reciprocating internal combustion engine comprising: a cylinder defining a cavity having a first end and a second end; and a piston moveable within the cavity of the cylinder between the first end and the second end, the apparatus comprising a controller configured to: receive at least a first signal; determine a quantity of liquid air to be injected using at least the received first signal; control injection of the determined quantity of liquid air into the first end of the cavity at a first time when the piston is closer to the first end than the second end.

The first signal may include user input data defining the fuel.

The first signal may include data defining one or more properties of the fuel. The one or more properties may include a combustion property of the fuel.

The first signal may include data defining an operating parameter of the reciprocating internal combustion engine.

The controller may be configured to control injection of fuel into the first end of the cavity to cause the piston to perform a power stroke.

The determined quantity of liquid air may be injected into the first end of the cavity without fuel to cause the piston to perform a first power stroke.

The controller may be configured to control injection of fuel into the first end of the cavity at a second time when the piston is closer to the first end than the second end to cause the piston to perform a second power stroke.

The controller may be configured to control injection of fuel into the first end of the cavity at a third time when the piston is closer to the first end than the second end to cause the piston to perform an initial power stroke, the third time being prior to the first time.

The liquid air may have greater oxygen content than atmospheric air.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
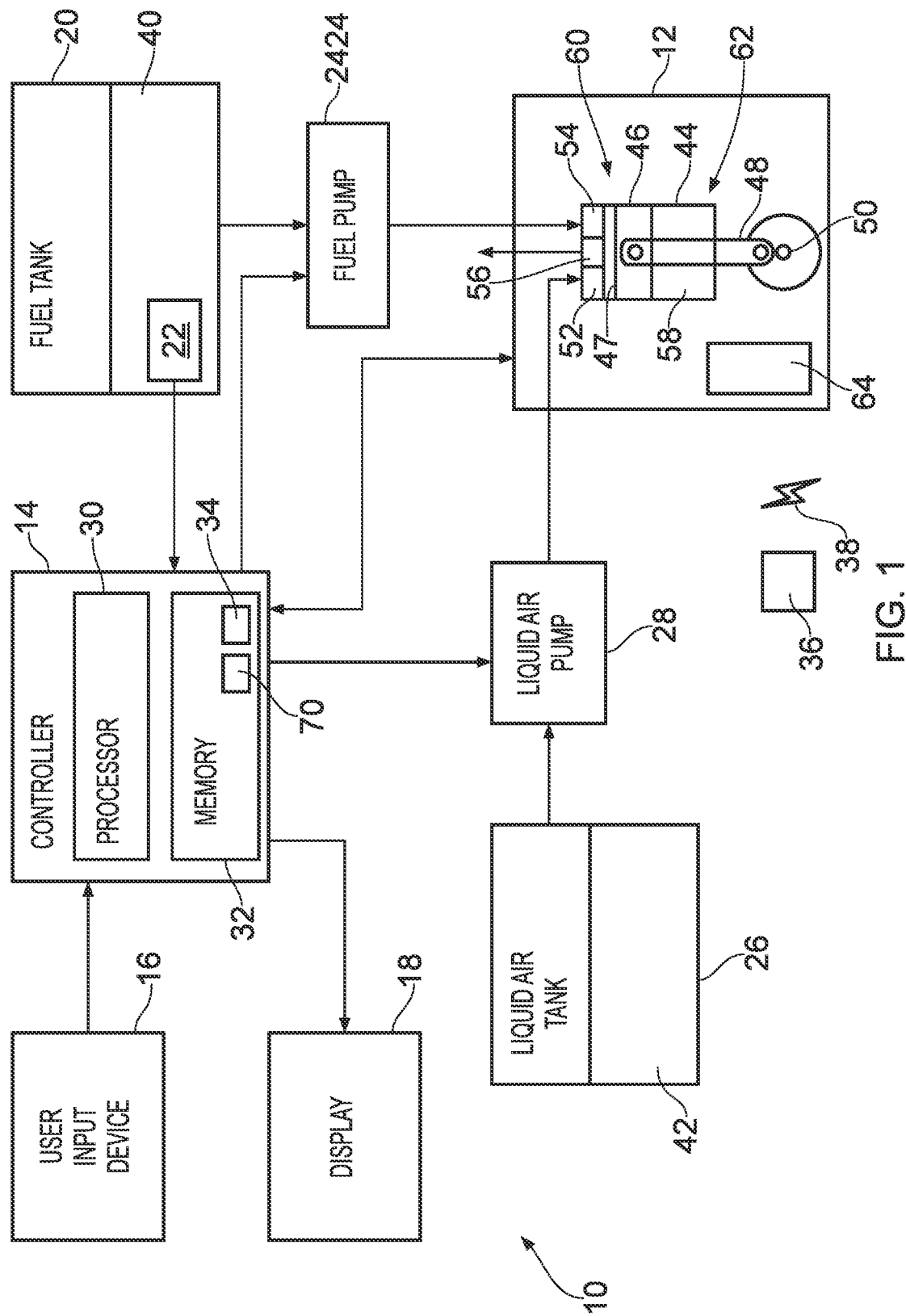
FIG. 1 illustrates a schematic diagram of apparatus for controlling a reciprocating internal combustion engine according to various examples.

FIG. 1 illustrates a schematic diagram of apparatus 10 for controlling a reciprocating internal combustion engine 12. The apparatus 10 includes a controller 14, a user input device 16, a display 18, a fuel tank 20, a first sensor arrangement 22, a fuel pump arrangement 24, a liquid air tank 26, and a liquid air pump arrangement 28. In some examples, the apparatus 10 may also comprise the reciprocating internal combustion engine 12.

In summary, the apparatus 10 is configured to control injection of liquid air into the reciprocating internal combustion engine 12 to cause the reciprocating internal combustion engine 12 to perform an additional power stroke. The quantity of liquid air injected into the reciprocating internal combustion engine 12 may be varied to provide the reciprocating internal combustion engine 12 with a variable compression ratio.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 14, and the remaining features (such as the user input device 16, the display 18, the fuel tank 20, the first sensor arrangement 22, the fuel pump arrangement 24, the liquid air tank 26, and the liquid air pump arrangement 28) may be added by another manufacturer, or by an end user.

The controller 14, the user input device 16, the display 18, the sensor arrangement 22, the fuel pump arrangement 24, the reciprocating internal combustion engine 12, and the liquid air pump arrangement 28 may be coupled to one another via wireless links and may consequently comprise transceiver circuitry and one or more antennas. Additionally or alternatively, the controller 14, the user input device 16, the display 18, the sensor arrangement 22, the fuel pump arrangement 24, the reciprocating internal combustion engine 12, and the liquid air pump arrangement 28 may be coupled to one another via wired links and may consequently comprise interface circuitry (such as a Universal Serial Bus (USB) socket) which are connected via cables. It should be appreciated that the controller 14, the user input device 16, the display 18, the sensor arrangement 22, the fuel pump arrangement 24, the reciprocating internal combustion engine 12, and the liquid air pump arrangement 28 may be coupled to one another via any combination of wired and wireless links.

Figure 2:
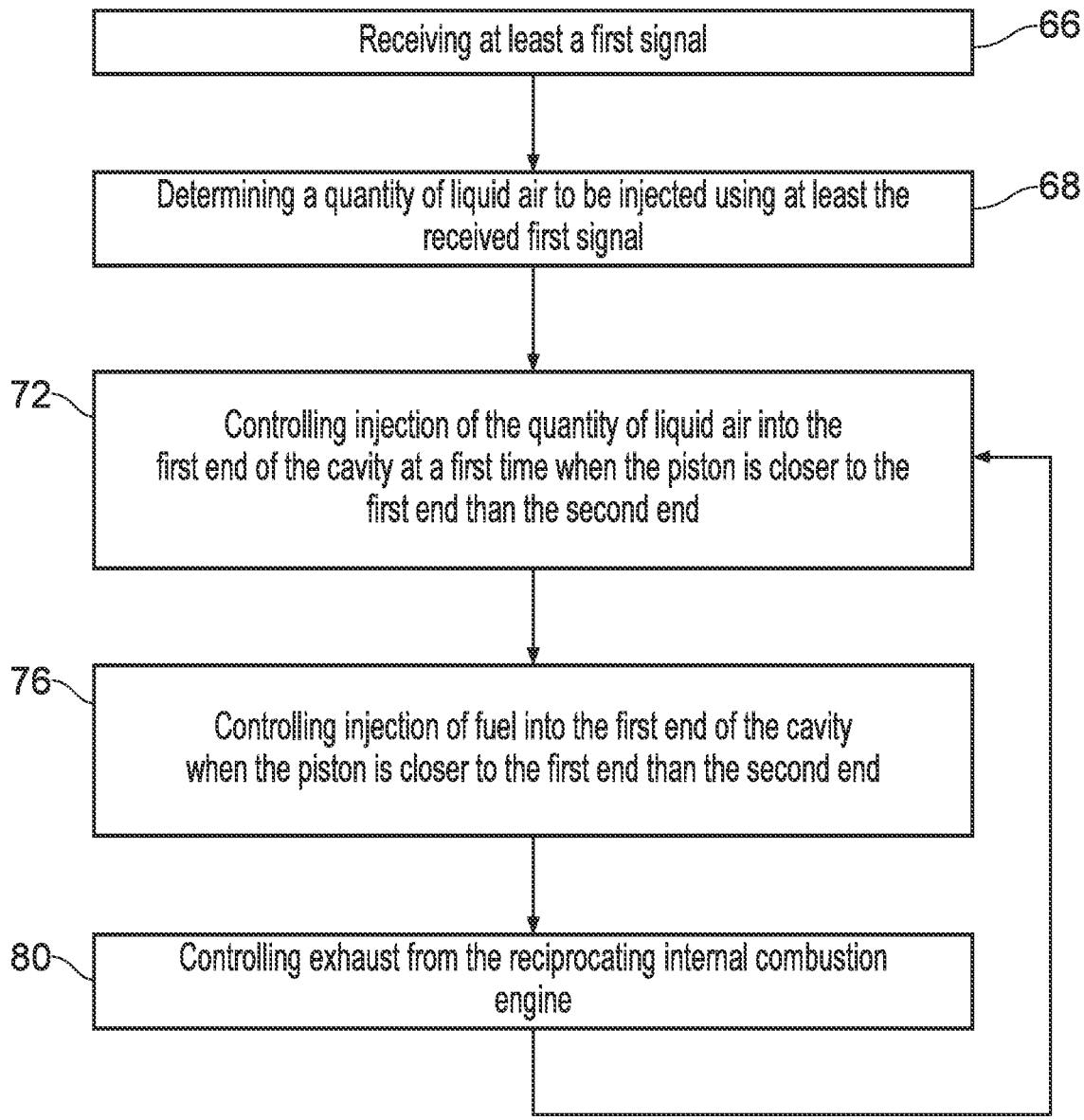
FIG. 2 illustrates a flow chart of a method of controlling the reciprocating internal combustion engine according to a first example.
Figure 9:
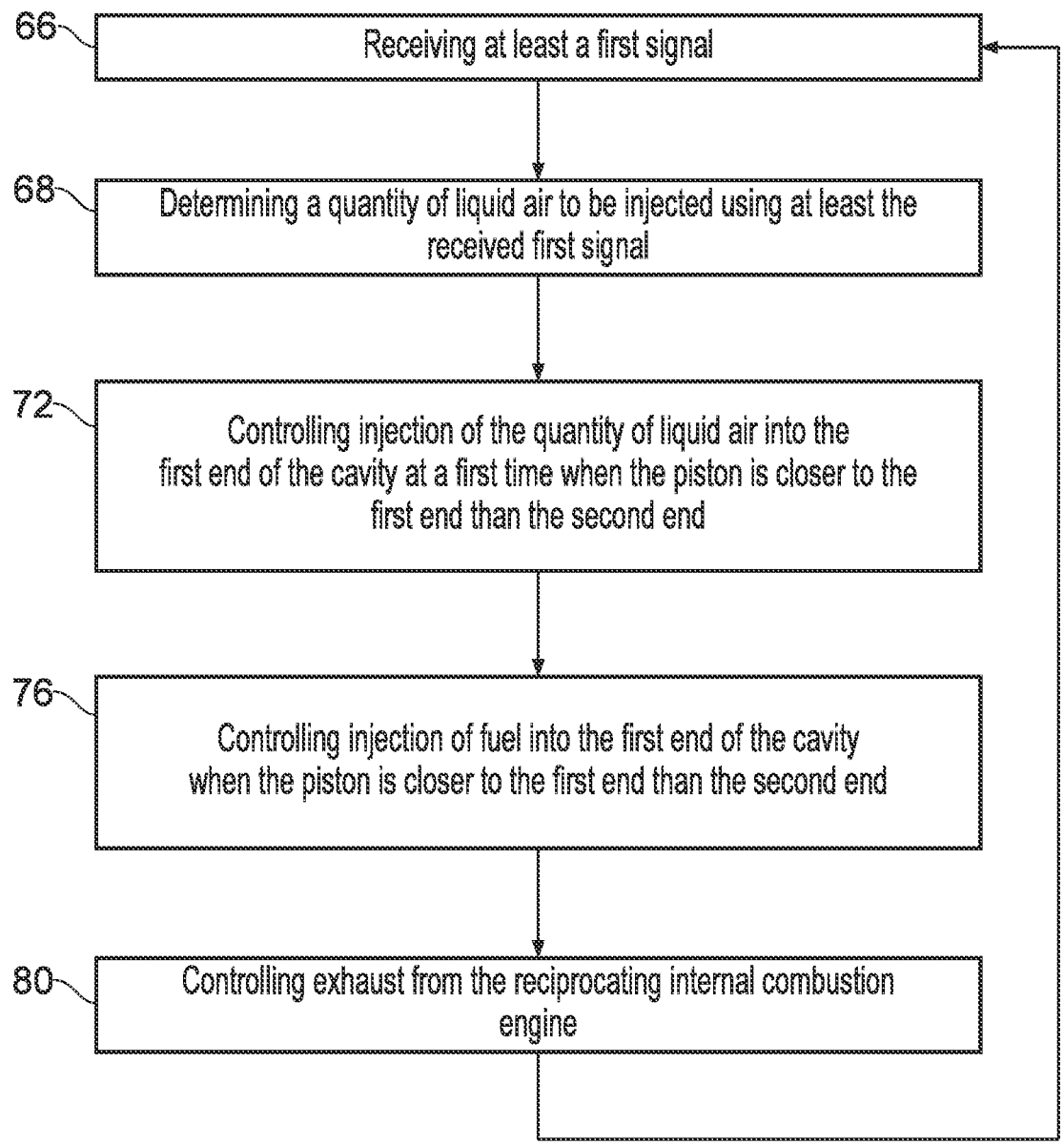
FIG. 9 illustrates a flow chart of a method of controlling the reciprocating internal combustion engine according to a second example.
Figure 10:
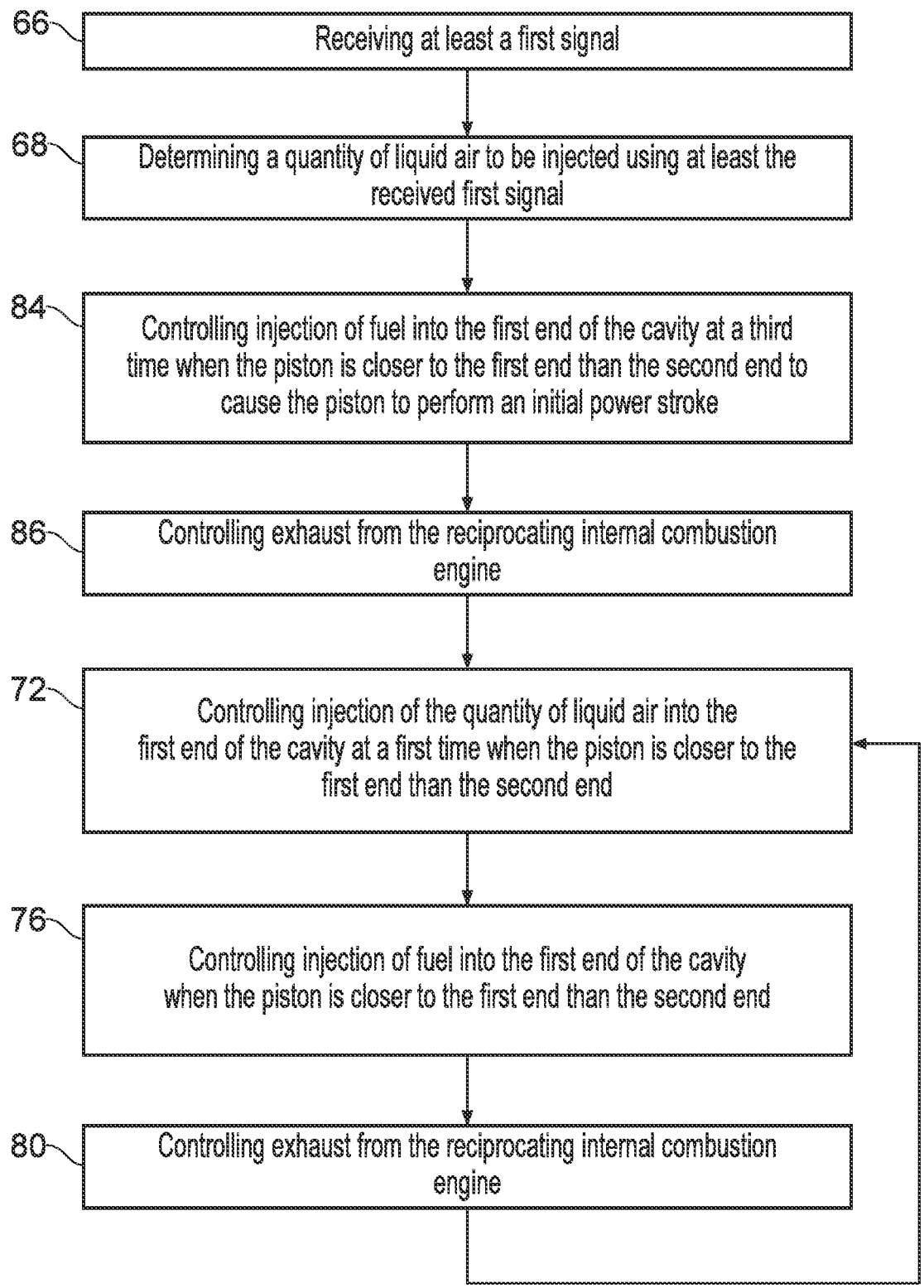
FIG. 10 illustrates a flow chart of a method of controlling the reciprocating internal combustion engine according to a third example.

The controller 14 may comprise any suitable circuitry to cause performance of the methods described herein and as illustrated in FIGS. 2, 9 and 10. The controller 14 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controller (PLC); and/or at least one microprocessor; and/or at least one microcontroller; and/or a central processing unit (CPU); and/or a graphics processing unit (GPU), to perform the methods.

The controller 14 may be positioned remote from the reciprocating internal combustion engine 12 (for example, the controller 14 may be positioned outside of a housing of the engine 12), may be a part of the reciprocating internal combustion engine 12 (for example, the controller 14 may be positioned within a housing of the engine 12), or may be distributed between the reciprocating internal combustion engine 12 and a location remote from the reciprocating internal combustion engine 12.

In various examples, the controller 14 may comprise at least one processor 30 and at least one memory 32. The memory 32 stores a computer program 34 comprising computer readable instructions that, when read by the processor 30, causes performance of the methods described herein, and as illustrated in FIGS. 2, 9 and 10. The computer program 34 may be software or firmware, or may be a combination of software and firmware.

The processor 30 may be located on the reciprocating internal combustion engine 12, or may be located remote from the reciprocating internal combustion engine 12, or may be distributed between the reciprocating internal combustion engine 12 and a location remote from the reciprocating internal combustion engine 12. The processor 30 may include at least one microprocessor and may comprise a single core processor, may comprise multiple processor cores (such as a dual core processor or a quad core processor), or may comprise a plurality of processors (at least one of which may comprise multiple processor cores).

The memory 32 may be located on the reciprocating internal combustion engine 12, or may be located remote from the reciprocating internal combustion engine 12, or may be distributed between the reciprocating internal combustion engine 12 and a location remote from the reciprocating internal combustion engine 12. The memory 32 may be any suitable non-transitory computer readable storage medium, data storage device or devices, and may comprise a hard disk drive and/or a solid state drive. The memory 32 may be permanent non-removable memory, or may be removable memory (such as a universal serial bus (USB) flash drive or a secure digital card). The memory 32 may include: local memory employed during actual execution of the computer program 34; bulk storage; and cache memories which provide temporary storage of at least some computer readable or computer usable program code to reduce the number of times code may be retrieved from bulk storage during execution of the code.

The computer program 34 may be stored on a non-transitory computer readable storage medium 36. The computer program 34 may be transferred from the non-transitory computer readable storage medium 36 to the memory 32. The non-transitory computer readable storage medium 36 may be, for example, a USB flash drive, a secure digital (SD)

card, or an optical disc. In some examples, the computer program 34 may be transferred to the memory 32 via a signal 38 (such as a wireless signal or a wired signal).

Input/output devices may be coupled to the controller 14 either directly or through intervening input/output controllers. Various communication adaptors may also be coupled to the controller 14 to enable the apparatus 10 to become coupled to other apparatus or remote printers or storage devices through intervening private or public networks. Non-limiting examples include modems and network adaptors of such communication adaptors.

The user input device 16 may comprise any suitable device or devices for enabling a human operator to provide an input to the apparatus 10. For example, the user input device 16 may comprise one or more of a keyboard, a keypad, a touchpad, a touchscreen display, and a computer mouse. The controller 14 is configured to receive signals from the user input device 16.

The display 18 may be any suitable device for displaying information to the human operator. For example, the display 18 may be a liquid crystal display, a light emitting diode display, an active matrix organic light emitting diode display, a thin film transistor display, or a cathode ray tube display. The controller 14 is arranged to control the display 18 to display information to the human operator.

The fuel tank 20 may comprise any suitable container, or containers, for storing one or more fuels 40. For example, the fuel tank 20 may comprise a single container storing diesel. In another example, the fuel tank 20 may comprise a first container storing diesel, a second container storing petroleum, and a third container storing liquefied natural gas.

The first sensor arrangement 22 may comprise any suitable sensor, or sensors, that are configured to sense one or more properties of the fuel 40. For example, the first sensor arrangement 22 may comprise one or more flow meters that are configured to sense the mass flow rate of the fuel 40 within the fuel tank 20. By way of another example, the first sensor arrangement 22 may comprise one or more sensors for determining a combustion property (such as octane number or cetane number) of the fuel 40. The controller 14 is configured to receive signals from the first sensor arrangement 22.

The fuel pump arrangement 24 comprises one or more pumps that are configured to move the fuel 40 from the fuel tank 20 to the reciprocating internal combustion engine 12. For example, where the fuel tank 20 comprises a plurality of containers storing different fuels, the fuel pump arrangement 24 may comprise a pump in each fuel line between each container and the reciprocating internal combustion engine 12. The controller 14 is configured to control the operation of the fuel pump arrangement 24.

The liquid air tank 26 may comprise any suitable container, or containers, for storing liquid air 42. For example, the liquid air tank 26 may comprise one or more vacuum insulated containers. In other examples, the liquid air tank 26 may comprise one or more containers that use multi-layered insulation and aerogels. Such containers may or may not include a vacuum layer. The liquid air 42 may have the same composition as atmospheric air (that is, a composition of approximately 78% nitrogen, 21% oxygen, and 1% argon), or may have a different composition to atmospheric air. For example, the liquid air 42 may have an oxygen rich composition (that is, a composition having greater oxygen content than atmospheric air) or may be liquid oxygen.

The liquid air pump arrangement 28 comprises one or more pumps for moving the liquid air 42 stored in the liquid air tank 26 to the reciprocating internal combustion engine 12. The controller 14 is configured to control the operation of the liquid air pump arrangement 28.

The reciprocating internal combustion engine 12 comprises a cylinder 44, a piston 46, a connecting rod 48, a crankshaft 50, a first valve 52, a second valve 54, and a third valve 56. It should be appreciated that the reciprocating internal combustion engine 12 may comprise a plurality of cylinders 44, pistons 46, connecting rods 48, crankshafts 50, first valves 52, second valves 54, and third valves, and that a single arrangement is illustrated to maintain the clarity of FIG. 1.

The cylinder 44 defines a cavity 58 having a first end 60 and a second end 62. The cylinder 44 may comprise any suitable material and may comprise a material having a low coefficient of thermal expansion (for example, a ceramic material). The piston 46 includes a piston head 47 and is arranged to move reciprocally within the cavity 58 of the cylinder 44 between a first position in proximity to the first end 60 and a second position in proximity to the second end 62 of the cavity 58. The crankshaft 50 is connected to the piston 46 via the connecting rod 48 and is arranged to convert the reciprocating motion of the piston 48 into rotational motion.

The first valve 52 is positioned at the first end 60 of the cavity 58 and is arranged to receive the liquid air 42 from the liquid air pump arrangement 28. The first valve 52 has an open configuration in which liquid air 42 is injected into the cavity 58, and a closed configuration which prevents liquid air 42 from being injected into the cavity 58. The controller 14 is configured to control the operation of the first valve 52.

The second valve 54 is positioned at the first end 60 of the cavity 58 and is arranged to receive fuel 40 from the fuel pump arrangement 24. The second valve 54 has an open configuration in which fuel 40 is injected into the cavity 58, and a closed configuration which prevents fuel 40 from being injected into the cavity 58. The controller 14 is configured to control the operation of the second valve 54.

The third valve 56 is positioned at the first end 60 of the cavity 58 and is arranged to exhaust gas from the cavity 58. The third valve 56 has an open configuration in which gases are exhausted from the cavity 58, and a closed configuration which prevents gases from being exhausted from the cavity 58. The controller 14 is configured to control the operation of the third valve 56.

The apparatus 10 may also comprise a second sensor arrangement 64 that is configured to sense one or more operating parameters of the reciprocating internal combustion engine 12. For example, the second sensor arrangement 64 may comprise one or more microphones for sensing engine knocking. In another example, the second sensor arrangement 64 may comprise one or more sensors for sensing the operating speed and/or power of the reciprocating internal combustion engine 12 (for example, by sensing the rotational speed of the crankshaft 50). The second sensor arrangement 64 may be part of the reciprocating internal combustion engine 12, or may be remote from the reciprocating internal combustion engine 12. The controller 14 is configured to receive signals from the second sensor arrangement 64.

The operation of the apparatus 10 according to a first example is described in the following paragraphs with reference to FIGS. 2 to 8.

At block 66, the method includes receiving at least a first signal.

In a first example, a human operator may have knowledge of the type of fuel stored in the fuel tank 20 and the human operator may operate the user input device 16 to select or define the type of fuel. The controller 14 may receive a signal from the user input device 16 that includes user input data defining the fuel 40. The user input data in the signal may identify the name of the fuel 40 (for example, gasoline, fuel oil, diesel fuel, and so on), or may identify the classification of the fuel 40 (for example, aromatic, paraffinic, naphthenic, and so on), or may identify a combustion property of the fuel 40 (for example, octane number or cetane number).

In a second example, the first sensor arrangement 22 may sense one or more properties of the fuel 40. The controller 14 may receive a signal from the first sensor arrangement 22 that includes data for the sensed one or more properties of the fuel 40. For example, the first sensor arrangement 22 may sense a mass flow rate of the fuel 40, and the controller 14 may receive a signal from the first sensor arrangement 22 that includes mass flow rate data. In another example, the first sensor arrangement 22 may sense a combustion property of the fuel 40 (octane number or cetane number for example), and the controller 14 may receive a signal from the first sensor arrangement 22 that includes the combustion property of the fuel 40.

In a third example, the second sensor arrangement 64 may sense one or more operating parameters of the reciprocating internal combustion engine 12. The controller 14 may receive a signal from the second sensor arrangement 64 that includes data for the sensed one or more operating parameters. For example, the second sensor arrangement 64 may sense engine knocking and/or engine speed and/or engine power of the reciprocating internal combustion engine 12, and the controller 14 may receive a signal from the second sensor arrangement 64 that includes engine knocking data and/or engine speed data and/or engine power data.

It should be appreciated that at block 66, the controller 14 may receive any combination of signals from the user input device 16, the first sensor arrangement 22, and the second sensor arrangement 64.

At block 68, the method includes determining a quantity of liquid air to be injected using at least the received first signal. For example, the memory 32 may store a data structure 70 (such as a look-up table) that defines quantities of liquid air to be injected into the cavity 58 of the cylinder 44 per stroke for a plurality of variables (such as fuel type, fuel classification, mass flow rate, combustion property, engine knocking level, engine speed level, engine power level, and so on). The controller 14 may use the data in at least the first signal to read the data structure 70 to determine a quantity of liquid air to be injected into the cavity 58 of the cylinder 44 per stroke. For example, the controller 14 may use data from the user input device 16 to identify the fuel type (petroleum for example), and may also use data from the first sensor arrangement 22 to identify a combustion property (octane number for example) of the fuel 40 to determine a quantity of liquid air to be injected per engine stroke.

It should be appreciated that in some examples, the data structure 70 may not be stored in the memory 32 and may instead be stored remotely from the apparatus 12 (in cloud storage for example).

At block 72, the method includes controlling injection of the determined quantity of liquid air, into the first end 60 of the cavity 58 at a first time when the piston 46 is closer to the first end 60 than the second end 62.

For example, the controller 14 may control the liquid air pump arrangement 28 to pump the liquid air 42 from the liquid air tank 26 to the reciprocating internal combustion engine 12, and may control the first valve 52 to move to the open configuration to allow liquid air to be injected into the cavity 58. The controller 14 may control the first valve 52 to move to the closed configuration in response to the injection of liquid air into the cavity 58 being completed.

The piston 46 may be closer to the first end 60 than the second end 62 when the piston head 47 is closer to the first end 60 than the second end 62. In other examples, the piston 46 may be closer to the first end 60 than the second end 62 when a midpoint of the piston 46 (that is, a position halfway between the piston head 47 and the surface opposite the piston head 47) is closer to the first end 60 than the second end 62. In some examples, block 72 may include controlling injection of the determined quantity of liquid air into the first end 60 of the cavity 58 at a first time when the piston 46 is at or near the first position (that is, the highest position of the piston 46 within the cavity 58).

In some examples, the determined quantity of liquid air may be injected into the first end 60 of the cavity 58, without fuel being injected, to cause the piston 46 to perform a first power stroke. In these examples, at the first time the controller 14 may control the fuel pump arrangement 24 to not pump the fuel 40 from the fuel tank 20 to the reciprocating internal combustion engine 12, or may maintain the fuel pump arrangement 24 in an inactive state. Additionally at the first time, the controller 14 may control the second valve 54 to move to the closed configuration (or to remain in the closed configuration) to prevent the fuel 40 from being injected into the cavity 58.

Figure 3:
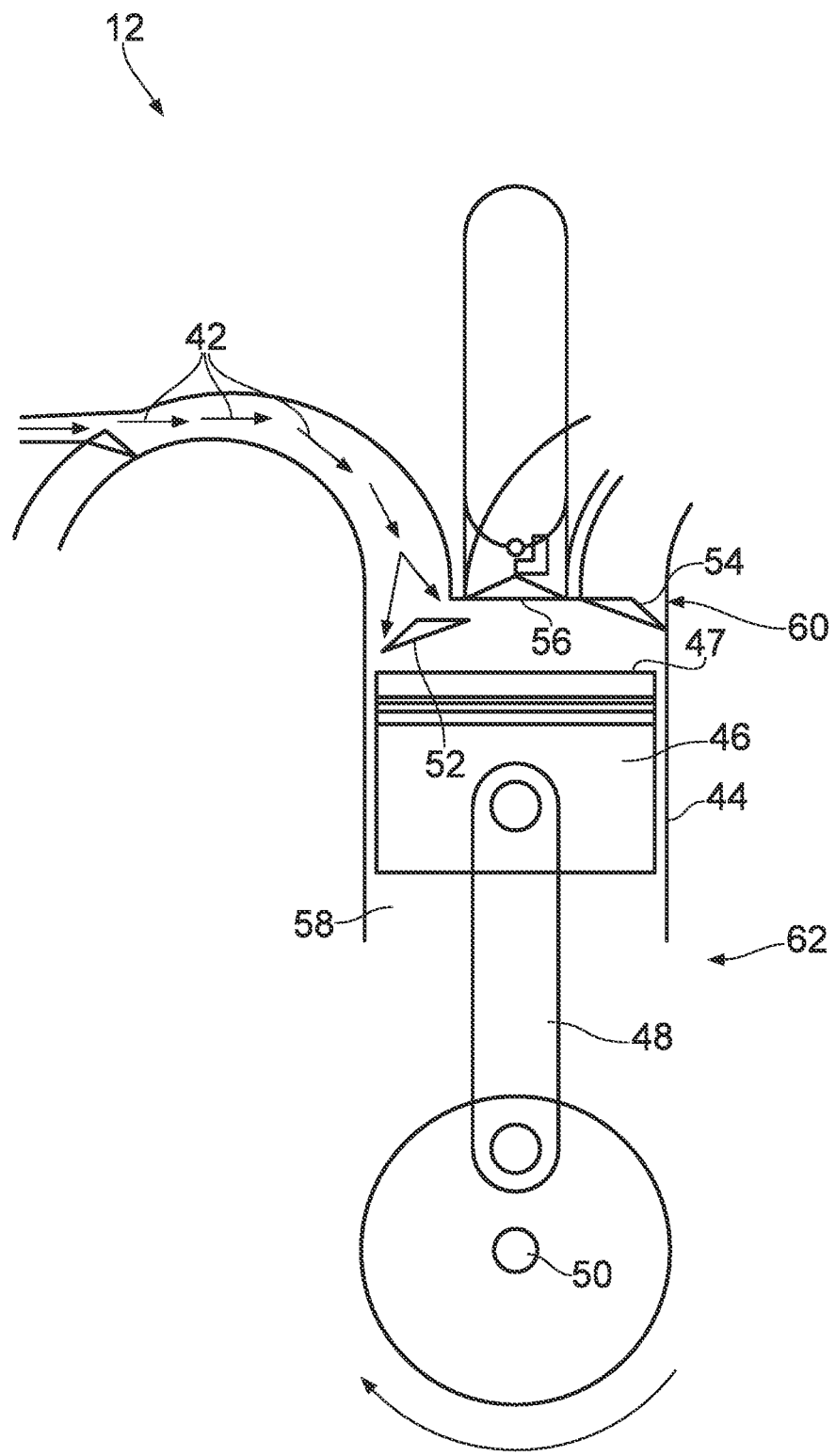
FIG. 3 illustrates a schematic diagram of the reciprocating internal combustion engine receiving liquid air.

FIG. 3 illustrates a schematic diagram of the reciprocating internal combustion engine 12 receiving liquid air 42. In more detail, the first valve 52 is in the open configuration to allow liquid air 42 to enter the cavity 58 between the piston head 47 and the first end 60 of the cavity 58. The second valve 54 is in the closed configuration to prevent fuel 40 from entering the cavity 58 between the piston head 47 and the first end 60 of the cavity 58. The third valve 56 is in the closed configuration to prevent fluid being exhausted from the cavity 58.

Figure 4:
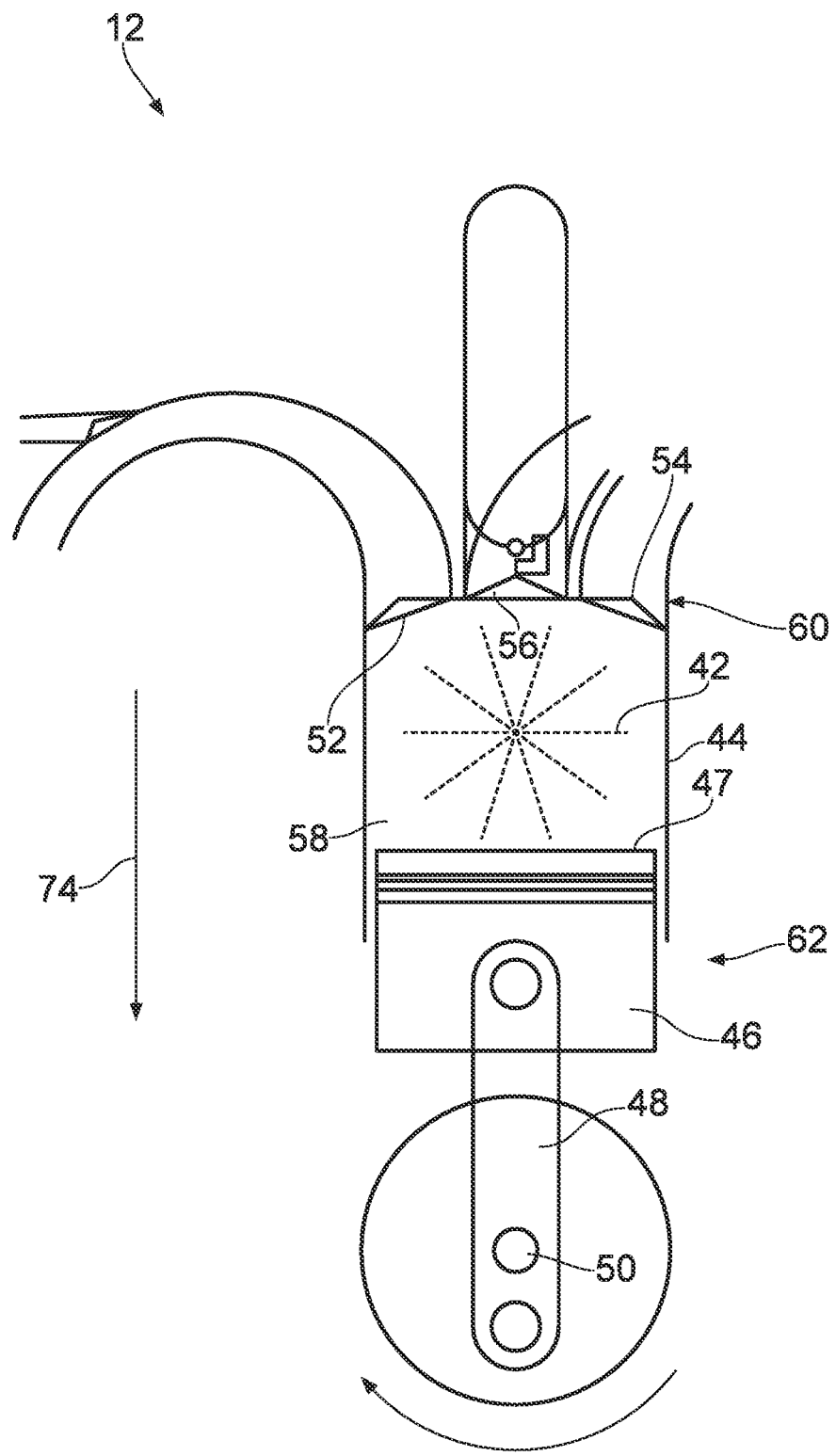
FIG. 4 illustrates a schematic diagram of the reciprocating internal combustion engine performing a first power stroke.

FIG. 4 illustrates a schematic diagram of the reciprocating internal combustion engine 12 performing a first power stroke. The liquid air 42 in the cavity 58 receives thermal energy from the reciprocating internal combustion engine 12, changes phase to a gas, and expands within the cavity 58. Since the first valve 52, the second valve 54 and the third valve 56 are in their closed configurations, the phase change and expansion of the liquid air 42 applies pressure to the piston 46 and causes the piston 46 to move towards the second end 62 of the cavity 58 and perform a first power stroke (as indicated by the arrow with reference numeral 74).

Subsequent to the first power stroke, the piston 46 may move towards the first end 60 of the cavity 58 and perform a compression stroke (that is, the air in the cavity 58 is compressed between the piston head 47 and the cylinder 44).

At block 76, the method includes controlling injection of fuel 40 into the first end 60 of the cavity 58 when the piston 46 is closer to the first end 60 than the second end 62. For example, the controller 14 may control the fuel pump arrangement 24 to pump the fuel 40 from the fuel tank 20 to the reciprocating internal combustion engine 12, and may control the second valve 54 to move to the open configuration to allow the fuel 40 to be injected into the cavity 58.

As mentioned in the preceding paragraphs, the piston 46 may be closer to the first end 60 than the second end 62 when the piston head 47 is closer to the first end 60 than the second end 62. In other examples, the piston 46 may be closer to the first end 60 than the second end 62 when a midpoint of the piston 46 (that is, a position halfway between the piston head 47 and the surface opposite the piston head 47) is closer to the first end 60 than the second end 62. In some examples, block 76 may include controlling injection of a quantity of fuel into the first end 60 of the cavity 58 when the piston 46 is at or near the first position (that is, at or near the highest position of the piston 46 within the cavity 58).

Where the determined quantity of liquid air is injected into the cavity 58 without fuel, block 76 may be performed at a second time that may be subsequent to the first power stroke and the compression stroke, and causes the piston 46 to perform a second power stroke (thus providing the reciprocating internal combustion engine 12 with a thermodynamic cycle having two power strokes). In other examples, block 76 may be performed at the same time as, or immediately after, block 72 to cause the piston 46 to perform a single power stroke per thermodynamic cycle of the reciprocating internal combustion engine 12. In these examples, the thermodynamic cycle may consist of two strokes or four strokes.

Figure 5:
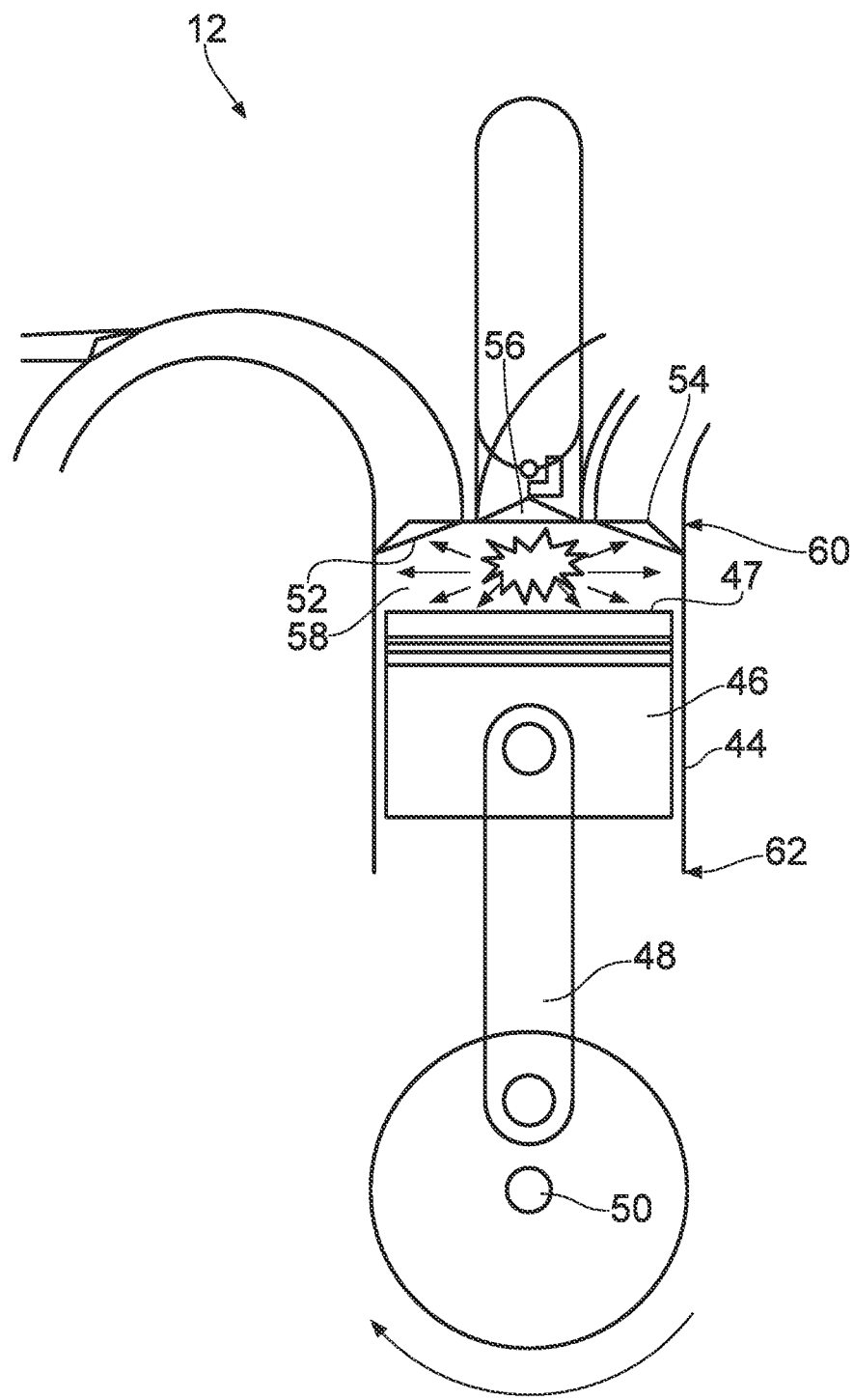
FIG. 5 illustrates a schematic diagram of ignition within the reciprocating internal combustion engine.

FIG. 5 illustrates a schematic diagram of ignition within the reciprocating internal combustion engine 12. The first valve 52, the second valve 54 and the third valve 56 are in their closed configurations, and the air and fuel mixture in the cavity 58 has been ignited. In some examples, the air and fuel mixture may ignite due to relatively high temperatures caused by high pressure within the cavity 58 (that is, the air and fuel mixture is ignited through compression ignition). In other examples, the reciprocating internal combustion engine 12 may include one or more spark plugs for igniting the air and fuel mixture within the cavity 58 (that is, the air and fuel mixture is ignited through spark ignition).

Figure 6:
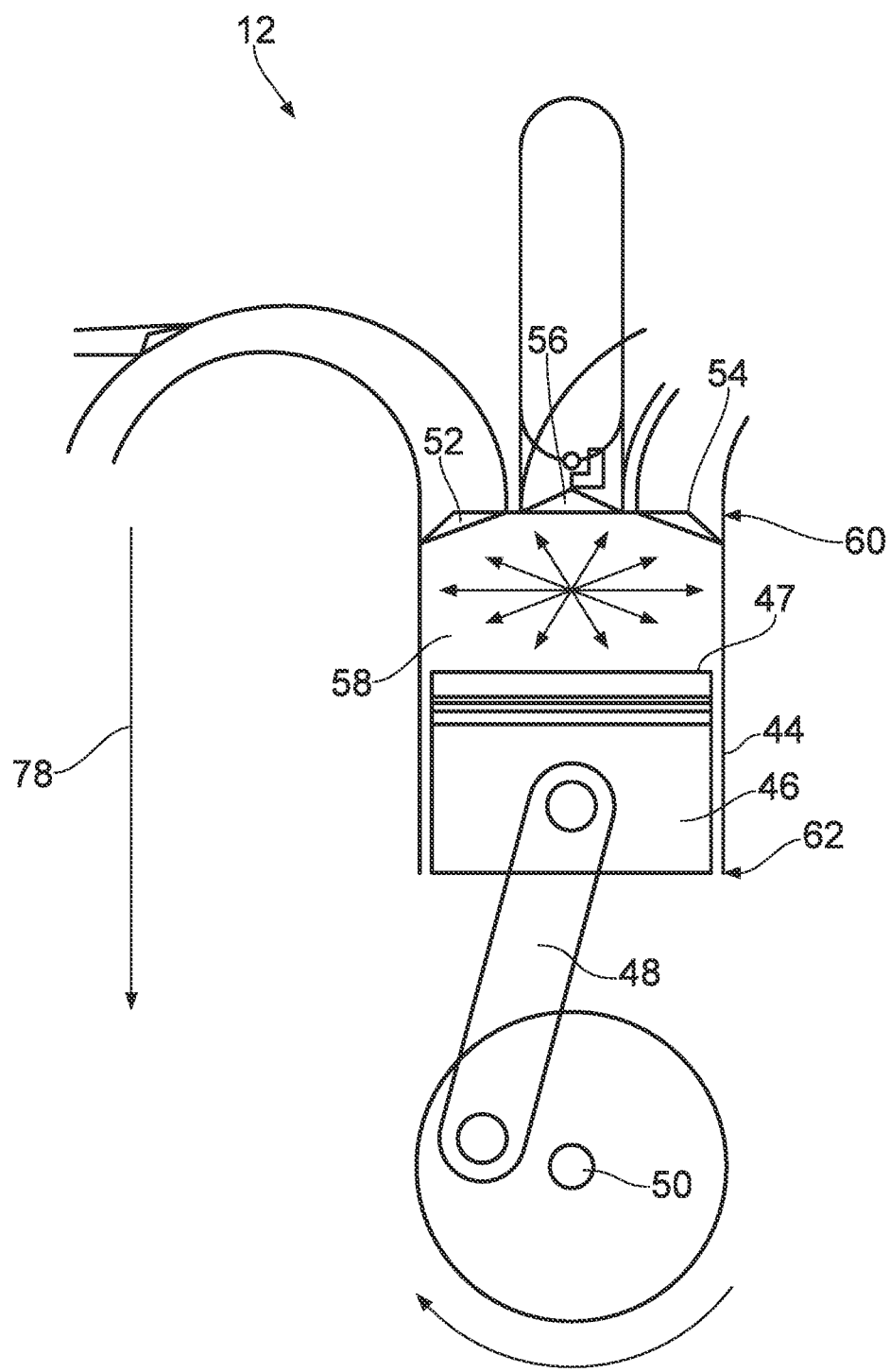
FIG. 6 illustrates a schematic diagram of the reciprocating internal combustion engine performing a second power stroke.

FIG. 6 illustrates a schematic diagram of the reciprocating internal combustion engine 12 performing a second power stroke. The first valve 52, the second valve 54 and the third valve 56 are in their closed configurations, the combustion of the air and fuel mixture applies pressure to the piston 46 and causes the piston 46 to move towards the second end 62 of the cavity 58 and perform a second power stroke (as indicated by the arrow with reference numeral 78).

At block 80, the method may include controlling exhaust from the reciprocating internal combustion engine 12. For example, when the piston 46 is at, or near the second position (that is, at or near the end of a power stroke), the controller 14 may control the third valve 56 to move to the open configuration to allow combustion products from the air and fuel mixture to be exhausted from the cavity 58.

Figure 7:
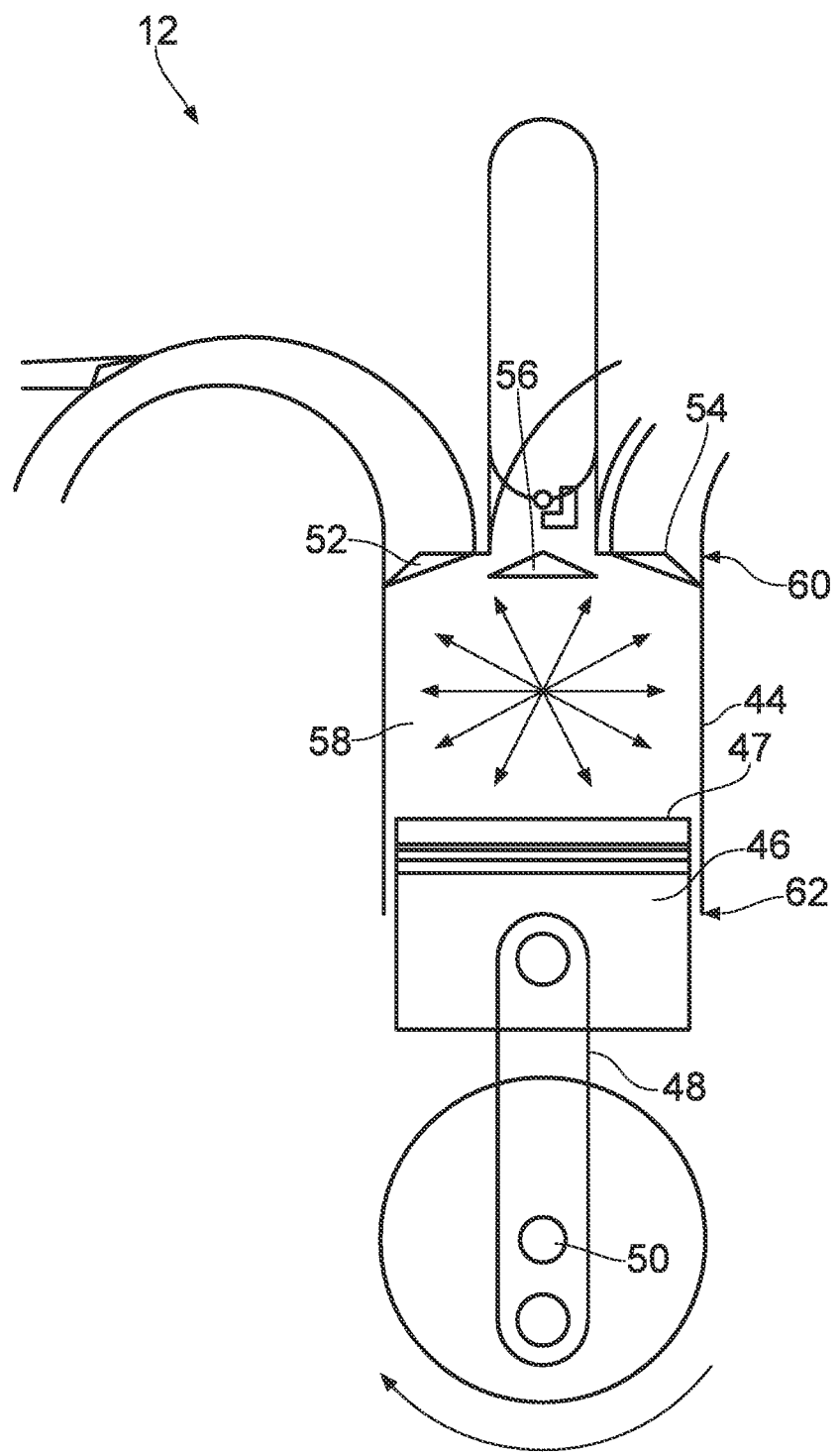
FIG. 7 illustrates a schematic diagram of the reciprocating internal combustion engine performing an exhaust stroke.

FIG. 7 illustrates a schematic diagram of the reciprocating internal combustion engine 12 performing an exhaust stroke. In more detail, the piston 46 is at, or near the end of the second power stroke, the first valve 52 and the second valve 54 are in their closed configurations, and the third valve 56 is in the open configuration to allow combustion products to be exhausted from the cavity 58.

Figure 8:
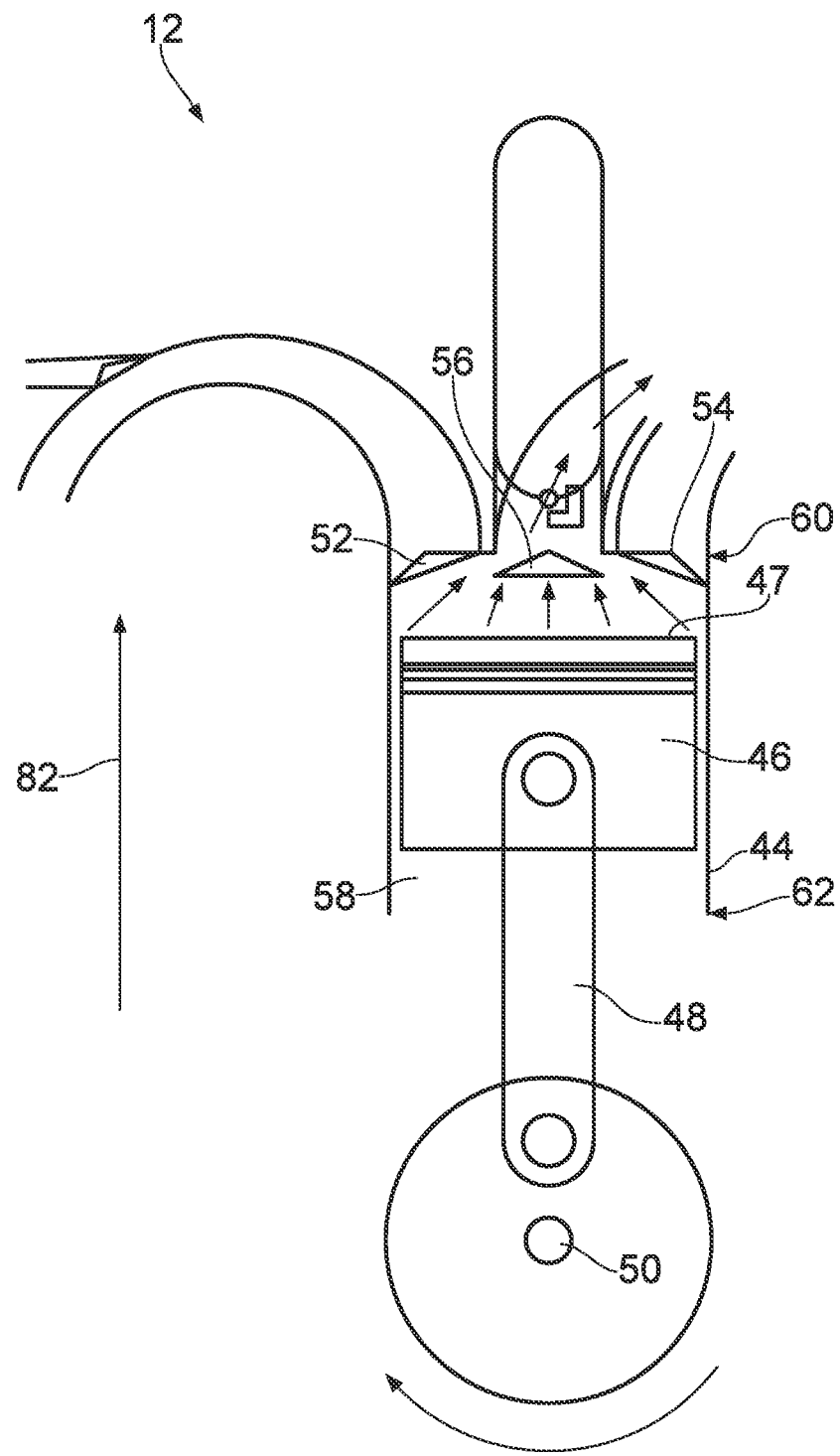
FIG. 8 illustrates a schematic diagram of the reciprocating internal combustion engine towards the end of the exhaust stroke.

FIG. 8 illustrates a schematic diagram of the reciprocating internal combustion engine 12 towards the end of the exhaust stroke. During the exhaust stroke, the piston 46 moves towards the first position in the direction of arrow 82 and causes combustion products to be exhausted via the third valve 56.

The method may then return to block 72 to perform another first power stroke using the quantity of liquid air determined at block 68.

The apparatus 10 and the method illustrated in FIG. 2 may provide several advantages. First, the quantity of liquid air to be injected can be determined from a received signal. This may advantageously enable the reciprocating internal combustion engine 12 to use various different fuels since the compression ratio of the engine 12 may be varied to combust a desired fuel by varying the quantity of liquid air to be injected. Second, the method may provide the reciprocating internal combustion engine 12 with a thermodynamic cycle having two power strokes. This may result in the reciprocating internal combustion engine 12 being more balanced and therefore less likely to vibrate during operation. Third, the liquid air and the fuel may be injected into the cavity 58 at different times and in different strokes. This may advantageously prevent the liquid air from freezing the fuel when injected into the cavity 58. Fourth, the use of liquid air may advantageously result in a lower average temperature of the components in the reciprocating internal combustion engine 12 and may thus reduce wear within, and increase the life of, the reciprocating internal combustion engine 12.

FIG. 9 illustrates a flow chart of a method of controlling the reciprocating internal combustion engine 12 according to a second example. The method illustrated in FIG. 9 is similar to the method illustrated in FIG. 2, and where the blocks are similar, the same reference numerals are used. The method illustrated in FIG. 9 differs from the method illustrated in FIG. 2 in that subsequent to block 80, the method may return to block 66. This feedback loop may advantageously enable the controller 14 to optimise the quantity of liquid air to be injected into the reciprocating internal combustion engine 12 during operation.

In one example, the second sensor arrangement 64 may sense one or more operating parameters (engine knocking for example) of the reciprocating internal combustion engine 12 during a power stroke (for example, the first power stroke and/or the second power stroke discussed above), and/or the compression stroke, and/or the exhaust stroke. The controller 14 may receive data from the second sensor arrangement 64 for the sensed one or more operating parameters at block 66 and then determine a quantity of liquid air to be injected for the subsequent first power stroke. For example, where the controller 14 determines engine knocking from the signal received from the second sensor arrangement 64, the controller 14 may reduce the quantity of liquid air to be injected at block 72 to reduce engine knocking.

In another example, a human operator may initially operate the user input device 16 to input the fuel type of the fuel 40 in the fuel tank 20. The controller 14 may determine an initial quantity of liquid air to be injected into the reciprocating internal combustion engine 12 using the user input signal and the data structure 70. In a subsequent cycle, the controller 14 may receive data from the first sensor arrangement 22 for the mass flow rate of the fuel 40. The controller 14 may use the mass flow rate data to optimise the quantity of liquid air to be injected into the reciprocating internal combustion engine 12.

FIG. 10 illustrates a flow chart of a method of controlling the reciprocating internal combustion engine 12 according to a third example. The method illustrated in FIG. 10 is similar to the methods illustrated in FIGS. 2 and 9 and where the features are similar, the same reference numerals are used.

The method illustrated in FIG. 10 differs from the methods illustrated in FIGS. 2 and 9 in that the method illustrated in FIG. 10 further comprises blocks 84 and 86 which may be performed between blocks 68 and 72, or may be performed prior to block 68.

At block 84, the method includes controlling injection of the fuel 40 into the first end 60 of the cavity 58 at a third time (which is prior to the first time and the second time) when the piston 46 is closer to the first end 60 than the second end 62 to cause the piston 46 to perform an initial power stroke.

For example, the controller 14 may control the reciprocating internal combustion engine 12 to perform an intake stroke (where gaseous air is injected into the cavity 58), a compression stroke, and then an initial power stroke to increase the temperature of the reciprocating internal combustion engine 12.

At block 86, the method includes controlling exhaust from the reciprocating internal combustion engine 12. For example, the controller 14 may control the third valve 56 to move to the open configuration to allow combustion products to be exhausted from the reciprocating internal combustion engine 12.

The method illustrated in FIG. 10 may be advantageous in that the initial thermodynamic cycle may raise the temperature of the reciprocating internal combustion engine 12 and thus cause improved expansion of injected liquid air within the cavity 58 at block 72. This may improve the performance of the reciprocating internal combustion engine 12 during initial operation.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

The invention claimed is:

1. A method of controlling a reciprocating internal combustion engine comprising: a cylinder defining a cavity having a first end and a second end; and a piston moveable within the cavity of the cylinder between the first end and the second end, the method comprising:
   receiving at least a first signal;
   determining a quantity of liquid air to be injected using at least the received first signal;
   controlling injection of the determined quantity of liquid air into the first end of the cavity at a first time when the piston is closer to the first end than the second end.

2. A method as claimed in claim 1, wherein the first signal includes user input data defining the fuel.

3. A method as claimed in claim 1, wherein the first signal includes data defining one or more properties of the fuel.

4. A method as claimed in claim 3, wherein the one or more properties include a combustion property of the fuel.

5. A method as claimed in claim 1, wherein the first signal includes data defining an operating parameter of the reciprocating internal combustion engine.

6. A method as claimed in claim 1, further comprising controlling injection of fuel into the first end of the cavity to cause the piston to perform a power stroke.

7. A method as claimed in claim 1, wherein the determined quantity of liquid air is injected into the first end of the cavity without fuel to cause the piston to perform a first power stroke.

8. A method as claimed in claim 7, further comprising controlling injection of fuel into the first end of the cavity at a second time when the piston is closer to the first end than the second end to cause the piston to perform a second power stroke.

9. A method as claimed in claim 1, further comprising controlling injection of fuel into the first end of the cavity at a third time when the piston is closer to the first end than the second end to cause the piston to perform an initial power stroke, the third time being prior to the first time.

10. A method as claimed in claim 1, wherein the liquid air has greater oxygen content than atmospheric air.

11. A non-transitory computer readable storage medium comprising computer readable instructions that, when read by a computer, cause performance of the method as claimed in claim 1.

12. Apparatus for controlling a reciprocating internal combustion engine comprising: a cylinder defining a cavity having a first end and a second end; and a piston moveable within the cavity of the cylinder between the first end and the second end, the apparatus comprising a controller configured to:
   receive at least a first signal;
   determine a quantity of liquid air to be injected using at least the received first signal; and
   control injection of the determined quantity of liquid air into the first end of the cavity at a first time when the piston is closer to the first end than the second end.

13. Apparatus as claimed in claim 12, wherein the first signal includes user input data defining the fuel.

14. Apparatus as claimed in claim 12, wherein the first signal includes data defining one or more properties of the fuel.

15. Apparatus as claimed in claim 14, wherein the one or more properties include a combustion property of the fuel.

16. Apparatus as claimed in claim 12, wherein the first signal includes data defining an operating parameter of the reciprocating internal combustion engine.

17. Apparatus as claimed in claim 12, wherein the controller is configured to control injection of fuel into the first end of the cavity to cause the piston to perform a power stroke.

18. Apparatus as claimed in claim 12, wherein the determined quantity of liquid air is injected into the first end of the cavity without fuel to cause the piston to perform a first power stroke.

19. Apparatus as claimed in claim 18, wherein the controller is configured to control injection of fuel into the first end of the cavity at a second time when the piston is closer to the first end than the second end to cause the piston to perform a second power stroke.

20. Apparatus as claimed in claim 12, wherein the controller is configured to control injection of fuel into the first end of the cavity at a third time when the piston is closer to the first end than the second end to cause the piston to perform an initial power stroke, the third time being prior to the first time.

* * * * *